United States Patent
Lee

(10) Patent No.: US 11,611,941 B2
(45) Date of Patent: *Mar. 21, 2023

(54) ROAMING METHOD BASED ON MESH WIFI, ELECTRONIC DEVICE AND COMPUTER PROGRAM PRODUCT

(71) Applicant: Nanning FuLian FuGui Precision Industrial Co., Ltd., Nanning (CN)

(72) Inventor: Yang-Han Lee, New Taipei (TW)

(73) Assignee: Nanning FuLian FuGui Precision Industrial Co., Ltd., Nanning (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,535

(22) Filed: Aug. 18, 2021

(65) Prior Publication Data

US 2022/0104145 A1  Mar. 31, 2022

Related U.S. Application Data

(63) Continuation of application No. 17/036,505, filed on Sep. 29, 2020, now Pat. No. 11,140,636.

(30) Foreign Application Priority Data

Sep. 25, 2020  (CN) .......................... 202011027552.3

(51) Int. Cl.
*H04W 84/18* (2009.01)
*H04W 52/24* (2009.01)
*H04W 52/26* (2009.01)

(52) U.S. Cl.
CPC ....... *H04W 52/244* (2013.01); *H04W 52/245* (2013.01); *H04W 52/265* (2013.01); *H04W 84/18* (2013.01)

(58) Field of Classification Search
CPC ............. H04W 52/244; H04W 52/245; H04W 52/265; H04W 84/18
USPC .................................................... 455/522, 69
See application file for complete search history.

(56) References Cited

U.S. PATENT DOCUMENTS

| | | | |
|---|---|---|---|
| 10,278,179 B2 * | 4/2019 | Amini | H04L 45/20 |
| 11,140,636 B1 * | 10/2021 | Lee | H04W 52/265 |
| 2006/0019679 A1 * | 1/2006 | Rappaport | G01S 5/02521 |
| | | | 455/456.1 |
| 2016/0076909 A1 * | 3/2016 | Klicpera | G01F 15/0755 |
| | | | 73/198 |
| 2018/0263220 A1 * | 9/2018 | Schab | G08B 25/10 |
| 2019/0234786 A1 * | 8/2019 | Klicpera | G01M 3/26 |
| 2020/0254619 A1 * | 8/2020 | Grundfest | B25J 9/1666 |
| 2020/0383172 A1 * | 12/2020 | McCracken | H04W 88/06 |
| 2022/0104145 A1 * | 3/2022 | Lee | H04W 52/245 |

* cited by examiner

*Primary Examiner* — Hai V Nguyen
(74) *Attorney, Agent, or Firm* — ScienBiziP, P.C.

(57) ABSTRACT

A roaming method based on MESH WIFI executable by an electronic device, comprising: calculating noise values and interference coefficients of a primary access point (AP) and surrounding APs, adjusting power values between the primary AP and the surrounding APs based on the noise values and the interference coefficients according to normalization, and, when a target AP from the surrounding APs reaches a preset condition, switching the client to connect to the target AP.

8 Claims, 4 Drawing Sheets

ROAMING METHOD BASED ON MESH WIFI, ELECTRONIC DEVICE AND COMPUTER PROGRAM PRODUCT

BACKGROUND

1. Technical Field

The disclosure relates to mobile devices, and more particularly to a roaming method based on MESH WIFI for an electronic device and a computer program product using the method.

2. Description of Related Art

Under the mesh wireless network architecture, when a multi-wireless access point (AP) agent finds that a user's receive channel power indicator (RCPI) value is lower than a preset value, it reports user-related information of the user to a multi-AP controller. At this time, the multi-AP controller publishes the user-related information to surrounding agents, (i.e., other APs). The surrounding agents obtain the RCPI values of the user's uplink via an off-channel, and returns collected user-related information to the multi-AP controller. The Multi-AP controller finally determines which agent the user should roam to.

BRIEF DESCRIPTION OF THE DRAWINGS

Many aspects of the preset disclosure can be better understood with reference to the following figures. The components in the figures are not necessarily drawn to scale, the emphasis instead being placed upon clearly illustrating the principles of the preset disclosure. Moreover, in the drawings, like reference numerals designate corresponding parts throughout the several views. Implementations of the preset technology will now be described, by way of embodiments, with reference to the attached figures, wherein.

DETAILED DESCRIPTION

Figure 1:
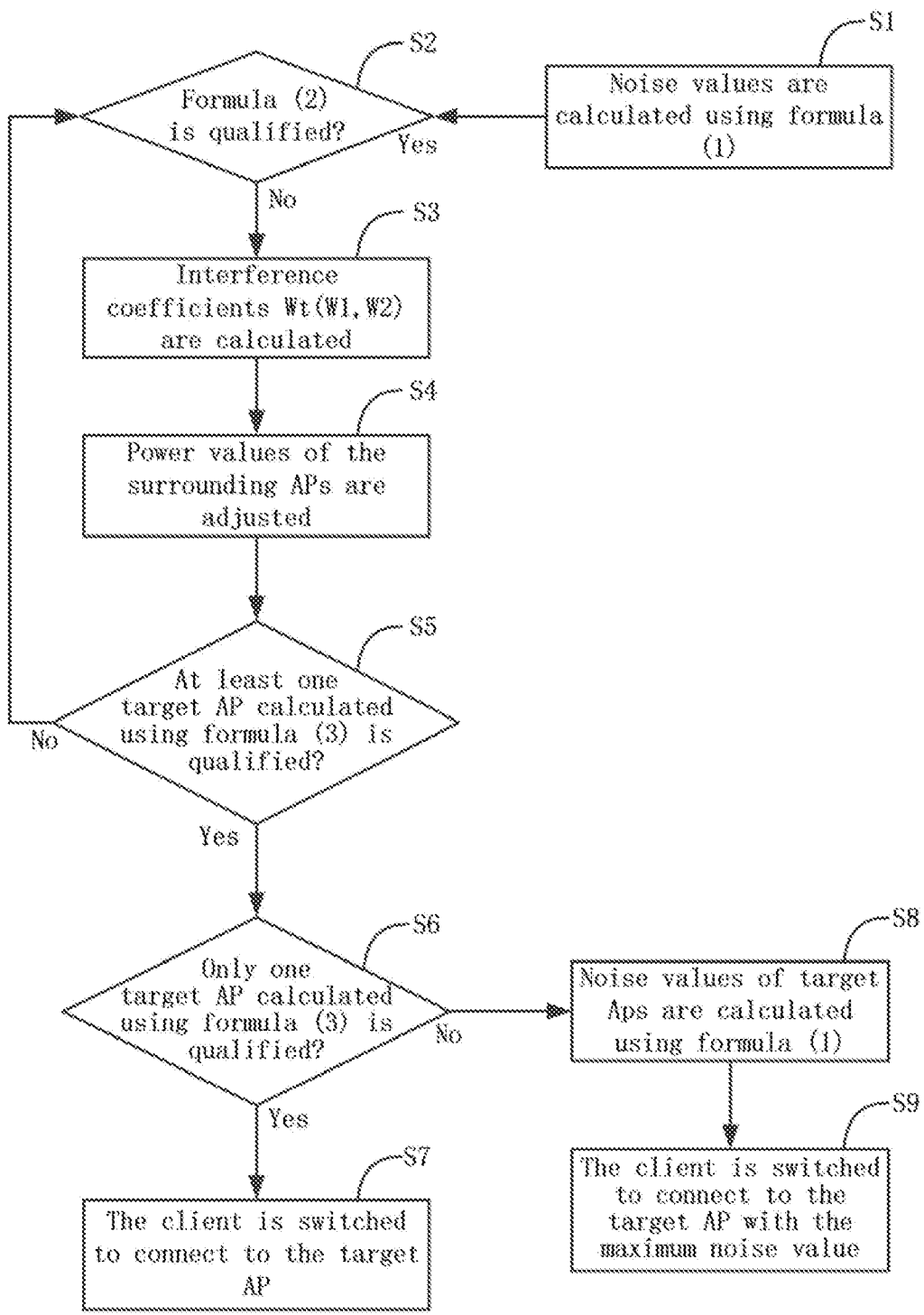
FIG. 1 is a flowchart of an embodiment of a roaming method based on MESH WIFI of the preset disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the preset disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a flowchart of an embodiment of a roaming method based on MESH WIFI, applied in an electronic device, of the preset disclosure. The order of the steps in the flowchart can be changed and some steps can be omitted according to different requirements.

In block S1, an AP, also called the primary AP, connected by a client is monitored in real-time and noise values between the primary AP and surrounding APs are calculated according to the mutual interference characteristics using formula (1) represented as:

$$Noise_{fromotherAPs} \frac{RCPI_{Client-uplink-AP}}{CINR_{Client}}. \tag{1}$$

In block S2, the noise values of the primary AP and the surrounding APs are substituted into the formula (2) to determine whether the formula (2) is qualified. The formula (2) is represented as:

$$\overline{\int_x^n (Noise_{fromotherAPs})dt} < \overline{\int_x^{n+k} (Noise_{fromotherAPs})dt}, \tag{2}$$

where x and n represent individual times.

If the formula (2) is not qualified, the process proceeds to block S1, and the step of calculating the noise values between the primary AP and the surrounding APs is repeated.

Figure 2:
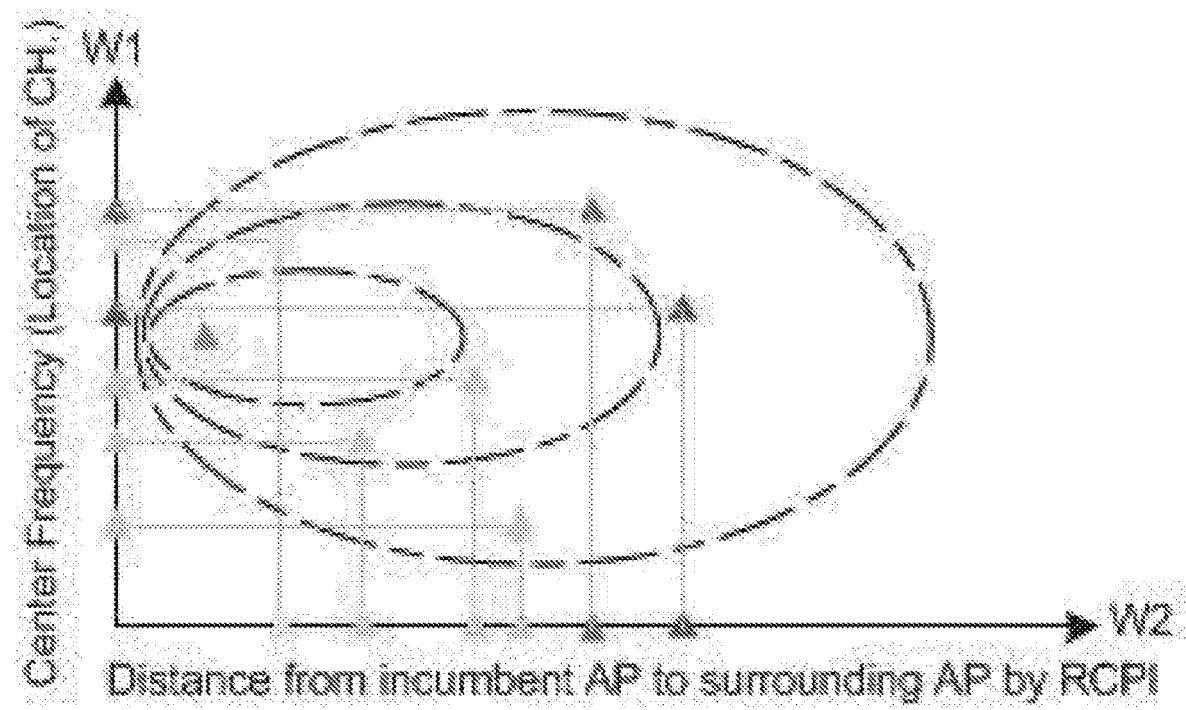
FIG. 2 is a schematic diagram of an embodiment of variations of an interference coefficients Wt(W1,W2) between a primary AP and surrounding APs of the preset disclosure.

In block S3, interference coefficients Wt(W1,W2) between the primary AP and the surrounding APs are calculated, where W1 indicates a leakage ratio calculated according to a center frequency of the primary AP, W2 indicates an interference source power calculated based on the RCPI values, and W(total)=(the interference source power)×(the leakage ratio). Referring to FIG. 2, which is a schematic diagram of an embodiment of variations of an interference coefficient Wt(W1,W2) between the primary AP and surrounding APs of the preset disclosure.

In block S4, power values between the primary AP and the surrounding APs are adjusted according to normalization. Maximum adjustable ranges of the powers for the surrounding APs are defined. A maximum adjustable range of the power is provided to the surrounding APs based on the user distribution status of the basic service area (BSS), thereby obtaining $\{(\Delta P_{MAX,1}), (\Delta P_{MAX,2}), \ldots, (\Delta P_{MAX,n})\}$. A reference AP is discovered to be served as the normalization base to obtain $\text{Min}\{\Delta P_{MAX,1} \cdot W_{t,1}, \Delta P_{MAX,2} \cdot W_{t,2}, \ldots, \Delta P_{MAX,n} \cdot W_{t,n}\}$. The adjusted power values of the surrounding APs are defined, if the reference AP is the i-th AP, to obtain $$\Delta P_{adjusted,k} = \frac{\Delta P_{MAX,i} \cdot W_{t,i}}{W_{t,k}}.$$

In block S5, it is determined whether at least one target AP calculated using the formula (3) is qualified, the formula (3) is represented as:

$$\overline{\int_x^n (Noise_{fromotherAPs})dt} > \overline{\int_x^{n+k}(Noise_{fromotherAPs})dt}. \quad (3)$$

In block S6, if at least one target AP calculated using the formula (3) is qualified, it is then determined whether only one target AP calculated using the formula (3) is qualified.

In block S7, if only one target AP calculated using the formula (3) is qualified, the client is switched to connect to the target AP.

In block S8, if more than one target APs calculated using the formula (3) are qualified, the noise values of the target APs are calculated using the formula (4) represented as:

$$Noise_{fromotherAPs} = \overline{\int_x^n (Noise_{fromotherAPs})dt} - \overline{\int_x^{n+k}(Noise_{fromotherAPs})dt}. \quad (4)$$

In block S9, the client is switched to connect to the target AP with the maximum noise value.

Figure 3:
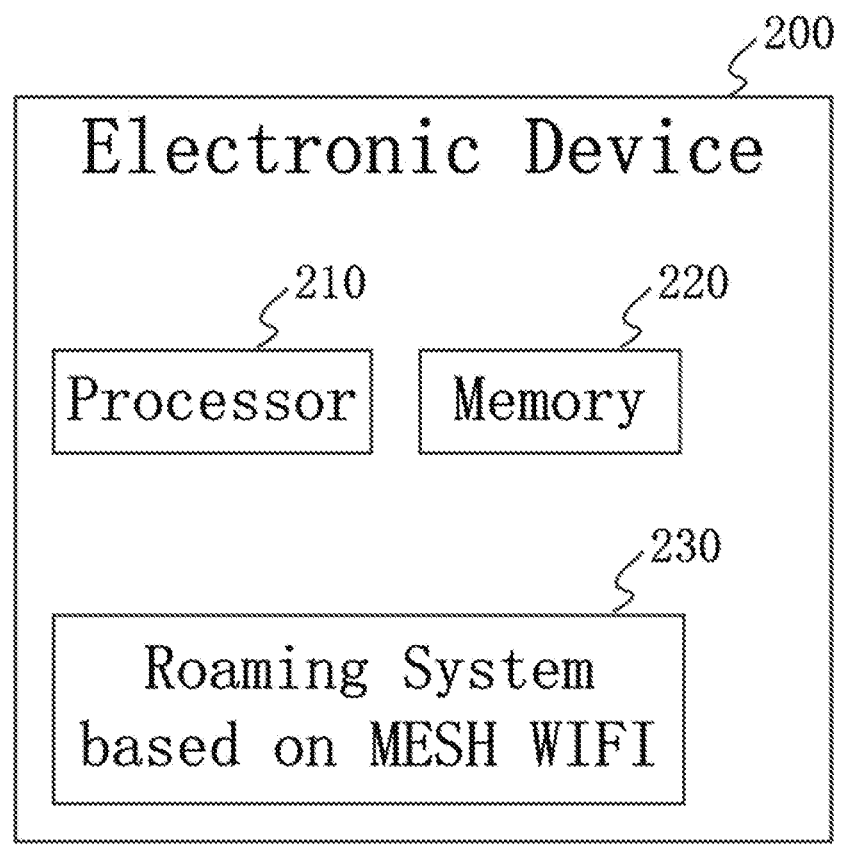
FIG. 3 is a block diagram of an embodiment of the hardware architecture of an electronic device using the method of the preset disclosure.

FIG. 3 is a block diagram of an embodiment of the hardware architecture of an electronic device using the roaming method based on MESH WIFI of the preset disclosure. The electronic device 200 may, but is not limited to, connect to a processor 210, a memory 220, and a roaming system based on MESH WIFI 230 via system buses. The electronic device 200 shown in FIG. 3 may include more or fewer components than those illustrated, or may combine certain components.

The memory 220 stores a computer program, such as the roaming system based on MESH WIFI 230, which is executable by the processor 210. When the processor 210 executes the roaming system based on MESH WIFI 230, the blocks in one embodiment of the roaming method based on MESH WIFI applied in the electronic device 200 are implemented, such as blocks S1 to S9 shown in FIG. 1.

It will be understood by those skilled in the art that FIG. 3 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the roaming system based on MESH WIFI 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The roaming system based on MESH WIFI 230 can be partitioned into one or more modules/units that are stored in the memory 220 and executed by the processor 210. The one or more modules/units may be a series of computer program instructions capable of performing particular functions of the roaming system based on MESH WIFI 230.

Figure 4:
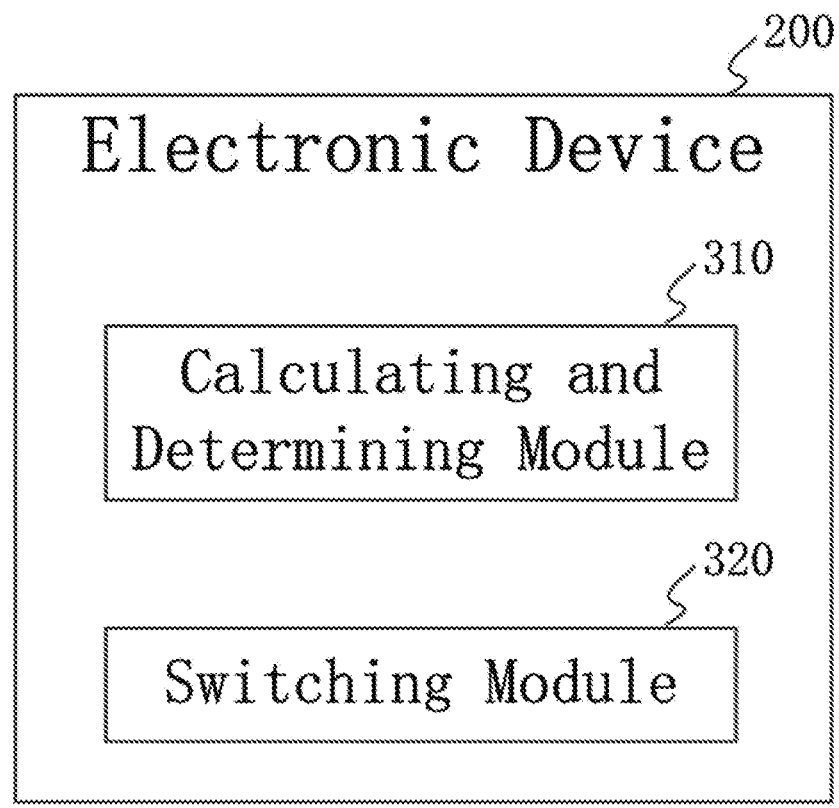
FIG. 4 is a schematic diagram of functional blocks of the electronic device using the method according to an embodiment of the preset disclosure.

FIG. 4 is a schematic diagram of an embodiment of functional blocks of the electronic device using the method of the preset disclosure.

The electronic device 200, such as a mobile phone, comprises a calculating and determining module 310 and a switching module 320.

The calculating and determining module 310 monitors an AP, also called the primary AP, connected by a client in real-time and noise values between the primary AP and surrounding APs are calculated according to the mutual interference characteristics using formula (1) represented as:

$$Noise_{fromotherAPs} = \frac{RCPI_{Client-uplink-AP}}{CINR_{Client}}. \quad (1)$$

The calculating and determining module 310 substitutes the noise values of the primary AP and the surrounding APs into the formula (2) to determine whether the formula (2) is qualified. The formula (2) is represented as:

$$\overline{\int_x^n (Noise_{fromotherAPs})dt} < \overline{\int_x^{n+k}(Noise_{fromotherAPs})dt}, \quad (2)$$

where x and n represent individual times.

If the formula (2) is not qualified, the process proceeds to block S1, and the step of calculating the noise values between the primary AP and the surrounding APs is repeated.

The calculating and determining module 310 calculates interference coefficients Wt(W1,W2) between the primary AP and the surrounding APs, where W1 indicates a leakage ratio calculated according to a center frequency of the primary AP, W2 indicates an interference source power calculated based on the RCPI values, and W(total)=(the interference source power)×(the leakage ratio). Referring to FIG. 2, which is a schematic diagram of an embodiment of variations of an interference coefficients Wt(W1,W2) between the primary AP and surrounding APs of the preset disclosure.

The calculating and determining module 310 adjusts power values between the primary AP and the surrounding APs according to normalization. Maximum adjustable ranges of the powers for the surrounding APs are defined. A maximum adjustable range of the power is provided to the surrounding APs based on the user distribution status of the basic service area (BSS), thereby obtaining $\{(\Delta P_{MAX,1}), (\Delta P_{MAX,2}), \ldots, (\Delta P_{MAX,n})\}$. A reference AP is discovered to be served as the normalization base to obtain Min $\{\Delta P_{MAX,1} \cdot W_{t,1}, \Delta P_{MAX,2} \cdot W_{t,2}, \ldots, \Delta P_{MAX,n} \cdot W_{t,n}\}$. The adjusted power values of the surrounding APs are defined, if the reference AP is the i-th AP, to obtain $$\Delta P_{adjusted,k} = \frac{\Delta P_{MAX,i} \cdot W_{t,i}}{W_{t,k}}.$$

The calculating and determining module 310 determines whether at least one target AP calculated using the formula (3) is qualified, the formula (3) is represented as:

$$\overline{\int_x^n (Noise_{fromotherAPs})dt} > \overline{\int_x^{n+k} (Noise_{fromotherAPs})dt}. \quad (3)$$

If at least one target AP calculated using the formula (3) is qualified, the calculating and determining module 310 then determines whether only one target AP calculated using the formula (3) is qualified.

If only one target AP calculated using the formula (3) is qualified, the switching module 320 switches the client to connect to the target AP.

If more than one target APs calculated using the formula (3) are qualified, the calculating and determining module 310 calculates the noise values of the target APs using the formula (4) represented as:

$$Noise_{fromotherAPs} = \overline{\int_x^n (Noise_{fromotherAPs})dt} - \overline{\int_x^{n+k} (Noise_{fromotherAPs})dt}. \quad (4)$$

The switching module 320 switches the client to connect to the target AP with the maximum noise value.

It is to be understood, however, that even though numerous characteristics and advantages of the preset disclosure have been set forth in the foregoing description, together with details of the structure and function of the preset disclosure, the disclosure is illustrative only, and changes may be made in detail, especially in matters of shape, size, and arrangement of parts within the principles of the preset disclosure to the full extent indicated by the broad general meaning of the terms in which the appended claims are expressed.

What is claimed is:

1. A roaming method based on MESH WIFI executable by a client, comprising:
    by using a multiple access point (multi-AP) agent, monitoring a primary access point (AP) connected by the client in real-time and calculating noise values between the primary AP and surrounding APs according to mutual interference characteristics of the APs using formula (1) represented as:

$$Noise_{fromotherAPs} = \frac{RCPI_{Client-uplink-AP}}{CINR_{Client}}; \quad (1)$$

by using the multi-AP agent, substituting the noise values of the primary AP and the surrounding APs into formula (2) to determine whether the formula (2) is qualified, wherein the formula (2) is represented as:

$$\overline{\int_x^n (Noise_{fromotherAPs})dt} < \overline{\int_x^{n+k} (Noise_{fromotherAPs})dt}, \quad (2)$$

where x and n represent individual times;
    by using the multi-AP agent, calculating interference coefficients Wt(W1,W2) between the primary AP and the surrounding APs, where W1 indicates a leakage ratio calculated according to a center frequency of the primary AP, W2 indicates an interference source power calculated based on the RCPI values, and W(total)=(the interference source power)×(the leakage ratio);
    by using the multi-AP agent, adjusting power values between the primary AP and the surrounding APs according to normalization;
    by using the multi-AP agent, determining whether at least one target AP calculated using formula (3) is qualified, wherein the formula (3) is represented as:

$$\overline{\int_x^n (Noise_{fromotherAPs})dt} > \overline{\int_x^{n+k} (Noise_{fromotherAPs})dt}; \quad (3)$$

by using the multi-AP agent, if a target AP calculated using formula (3) is qualified, sending a notification to a multi-AP controller, and
    by using the multi-AP controller, switching the client to connect to the target AP.

2. The method of claim 1, further comprising:
    by using the multi-AP agent, if more than one target APs calculated using the formula (3) are qualified, calculating the noise values of the target APs using formula (4) represented as:

$$Noise_{fromotherAPs} = \overline{\int_x^n (Noise_{fromotherAPs})dt} - \overline{\int_x^{n+k} (Noise_{fromotherAPs})dt}; \quad (4)$$

and
    by using the multi-AP controller, switching the client to connect to the target AP with the maximum noise value.

3. The method of claim 1, wherein the step of adjusting the power values between the primary AP and the surrounding APs according to the normalization further comprises:
    by using the multi-AP agent, defining maximum adjustable ranges of the powers for the surrounding APs;
    by using the multi-AP agent, providing a maximum adjustable range of the power to the surrounding APs based on a user distribution status of a basic service area (BSS) to obtain $\{(\Delta P_{MAX,1}), (\Delta P_{MAX,2}), \ldots, (\Delta P_{MAX,n})\}$;
    by using the multi-AP agent, discovering a reference AP to be served as the normalization base to obtain $Min\{\Delta P_{MAX,1} \cdot W_{t,1}, \Delta P_{MAX,2} \cdot W_{t,2}, \ldots, \Delta P_{MAX,n} \cdot W_{t,n}\}$; and
    by using the multi-AP agent, defining the adjusted power values of the surrounding APs if the reference AP is the i-th AP to obtain $$\Delta P_{adjusted,k} = \frac{\Delta P_{MAX,i} \cdot W_{t,i}}{W_{t,k}}.$$

4. The method of claim 1, further comprising:
    by using the multi-AP agent, if the formula (2) is not qualified, the process proceeds to block S1, repeating the step of calculating the noise values between the primary AP and the surrounding APs.

5. A roaming system based on MESH WIFI, comprising:
    a client;
    a multi-AP agent, configured to:
    monitor a primary access point (AP) connected by a client in real-time and calculate noise values between the primary AP and surrounding APs according to mutual interference characteristics of the APs using formula (1) represented as:

$$Noise_{fromotherAPs} = \frac{RCPI_{Client-uplink-AP}}{CINR_{Client}}; \quad (1)$$

substitute the noise values of the primary AP and the surrounding APs into formula (2) to determine whether the formula (2) is qualified, wherein the formula (2) is represented as:

$$\overline{\int_x^n (Noise_{fromotherAPs})dt} < \overline{\int_x^{n+k}(Noise_{fromotherAPs})dt}, \quad (2)$$

where x and n represent individual times;
calculate interference coefficients Wt(W1,W2) between the primary AP and the surrounding APs, where W1 indicates a leakage ratio calculated according to a center frequency of the primary AP, W2 indicates an interference source power calculated based on the RCPI values, and W(total)=(the interference source power)×(the leakage ratio);
adjust power values between the primary AP and the surrounding APs according to normalization; and
determine whether at least one target AP calculated using formula (3) is qualified, wherein the formula (3) is represented as:

$$\overline{\int_x^n (Noise_{fromotherAPs})dt} > \overline{\int_x^{n+k}(Noise_{fromotherAPs})dt}; \quad (3)$$

and
send a notification if a target AP calculated using formula (3) is qualified; and
a multi-AP controller switch, configured to receive the notification and switch the client to connect to the target AP according to the notification.

6. The system of claim 5, wherein:
the multi-AP agent is further configured to, if more than one target APs calculated using the formula (3) are qualified, calculate the noise values of the target APs using formula (4) represented as:

$$Noise_{fromotherAPs} = \overline{\int_x^n (Noise_{fromotherAPs})dt} - \overline{\int_x^{n+k}(Noise_{fromotherAPs})dt}; \quad (4)$$

and
the multi-AP controller is further configured to switch the client to connect to the target AP with the maximum noise value.

7. The system of claim 5, wherein:
the multi-AP agent is further configured to define maximum adjustable ranges of the powers for the surrounding APs, provide a maximum adjustable range of the power to the surrounding APs based on a user distribution status of a basic service area (BSS) to obtain $\{(\Delta P_{MAX,1}), (\Delta P_{MAX,2}), \ldots, (\Delta P_{MAX,n})\}$, discover a reference AP to be served as the normalization base to obtain $\text{Min}\{\Delta P_{MAX,1} \cdot W_{t,1}, \Delta P_{MAX,2} \cdot W_{t,2}, \ldots, \Delta P_{MAX,n} \cdot W_{t,n}\}$, and define the adjusted power values of the surrounding APs if the reference AP is the i-th AP to obtain $$\Delta P_{adjusted,k} = \frac{\Delta P_{MAX,i} \cdot W_{t,i}}{W_{t,k}}.$$

8. The system of claim 5, wherein the multi-AP agent is further configured to, if the formula (2) is not qualified, repeat the step of calculating the noise values between the primary AP and the surrounding APs.

* * * * *